Oct. 21, 1969 S. S. DAVIS ET AL 3,473,669
DISC SECTOR FOR ROTARY DISC FILTER
Filed Jan. 23, 1967 2 Sheets-Sheet 1

INVENTORS
STEVEN S. DAVIS
KENT L. DAVIS
JOHN C. BROZOVICH
BY: C. Harvey

ATTORNEY.

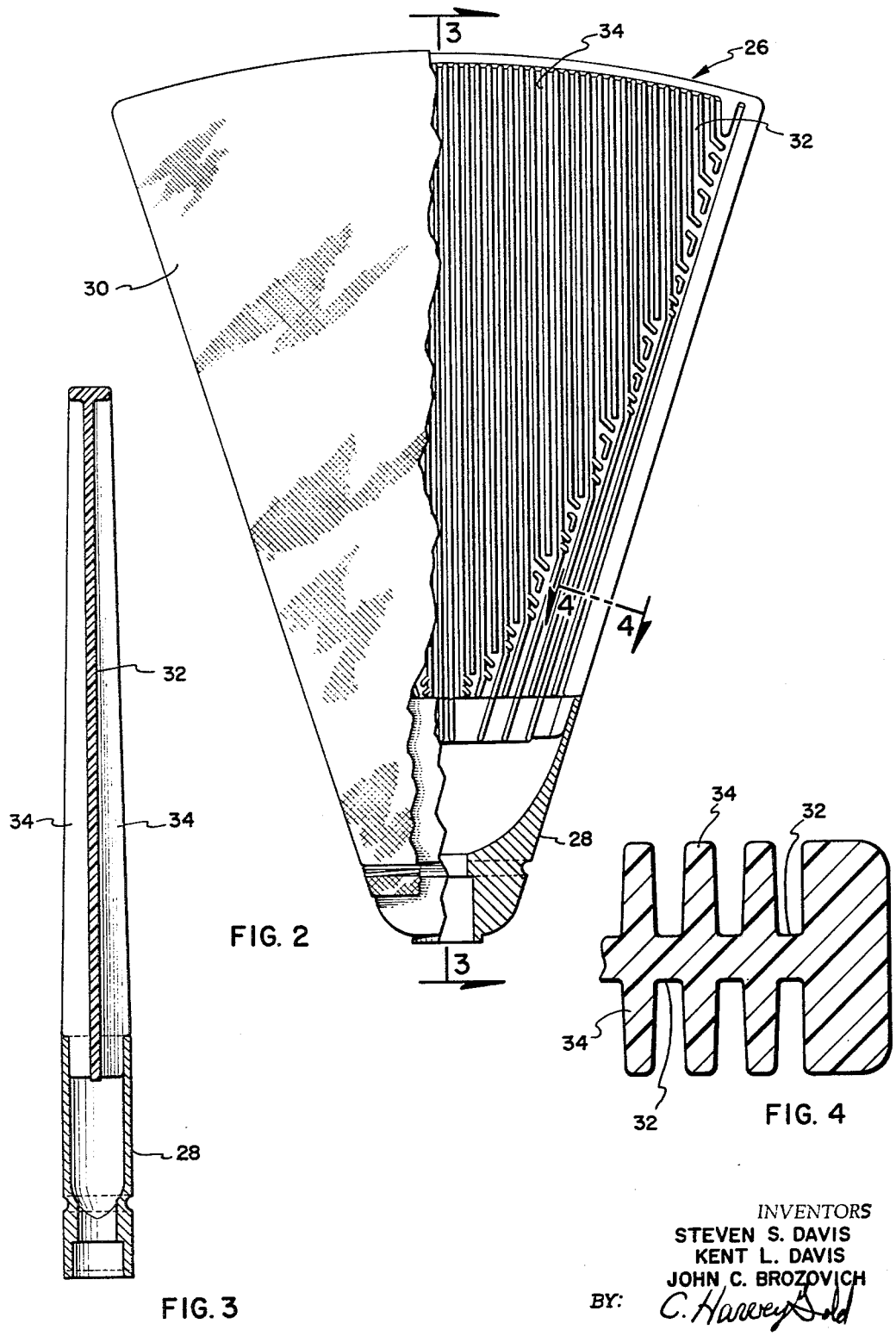

United States Patent Office 3,473,669
Patented Oct. 21, 1969

3,473,669
DISC SECTOR FOR ROTARY DISC FILTER
Steven S. Davis, Bountiful, and Kent L. Davis and John C. Brozovich, Salt Lake City, Utah, assignors to Envirotech Corporation, Salt Lake City, Utah, a corporation of Delaware
Filed Jan. 23, 1967, Ser. No. 610,901
Int. Cl. B01d 33/22, 25/32
U.S. Cl. 210—486                                        10 Claims

ABSTRACT OF THE DISCLOSURE

A wedge shaped filter disc sector with major flow channels along the side edges leading to discharge at the apex and a plurality of interior minor flow channels communicating with and directing fluid flow into said major channels at spaced points therealong. The channels may increase in depth as they approach the discharge zone.

---

This invention relates generally to a disc sector for rotary disc type filters.

In rotary disc filters, one or more substantially circular discs are mounted on a horizontal shaft for rotation of successive sector of said disc into and out of a slurry. During submergence applied vacuum draws filtrate through a filter medium covering the sector, while forming a filter cake thereon. The cake is discharged from the disc by scraping or the application of pressured air beneath the filter medium. In such filters, a frequently encountered problem is that some filtrate is retained residually in the sector and may flow or be blown back through the filter medium into the cake at the discharge point thereby causing an undesirable increase in cake moisture. This problem is most prevalent along the leading edge of a sector as such edge is on the low side at the cake discharge zone hence collects most of the residual liquid from the entire sector.

It is the primary object of this invention to provide an improved disc sector having flow characteristics such that in normal operation an increased air volume is drawn through the edge channel portions of the disc thereby providing an air sweep to effect complete removal of all filtrate to thus avoid blow back problems.

Briefly, the invention comprises a disc sector formed with a wedge or generally triangular shaped base web having ridge means on at least one face which form a plurality of channels for directing filtrate to a discharge zone at the apex of the sector. Major channels are formed parallel to the radial side edges of the sector and lead directly to the discharge zone. At least some of the minor or interior channels between the sector edges communicate with the major channels at spaced points therealong thereby directing additional increments of filtrate or air into the major channels for evenutual flow to the discharge zone. Since the major channels handle flow from a relatively wide filter area, and the flow volume increases on approach to discharge zone, the channels are preferably formed with increasing depth as they approach said discharge zone to accommodate the increasing volume.

During air drying of the cake the increased air volumes drawn through the major channels sweep residual filtrate from the sector edge.

So that the invention may be more readily understood and carried into effect, reference is made to the accompanying drawings which are offered by way of example only and are not to be taken as limiting the invention, the scope of which is defined by the appended claims which obviously embrace equivalent structures.

In the drawings:

FIG. 2 is a plan view of a sector made according to the invention and of a bell adaptor used to connect the sector to a rotatable shaft. For clarity, the bell adapter is partially broken away and the disc sector is shown partially covered with a suitable filter medium.

FIG. 3 is a sectional view taken in the plane of line 3—3 of FIG. 2 illustrating the preferred tapered construction of the sector and also illustrating a bell adaptor affixed to said sector.

FIG. 4 is a sectional view taken in the plane of line 4—4 of FIG. 2 illustrating the arrangement of ridges and resulting channels on the sector.

Figure 1:
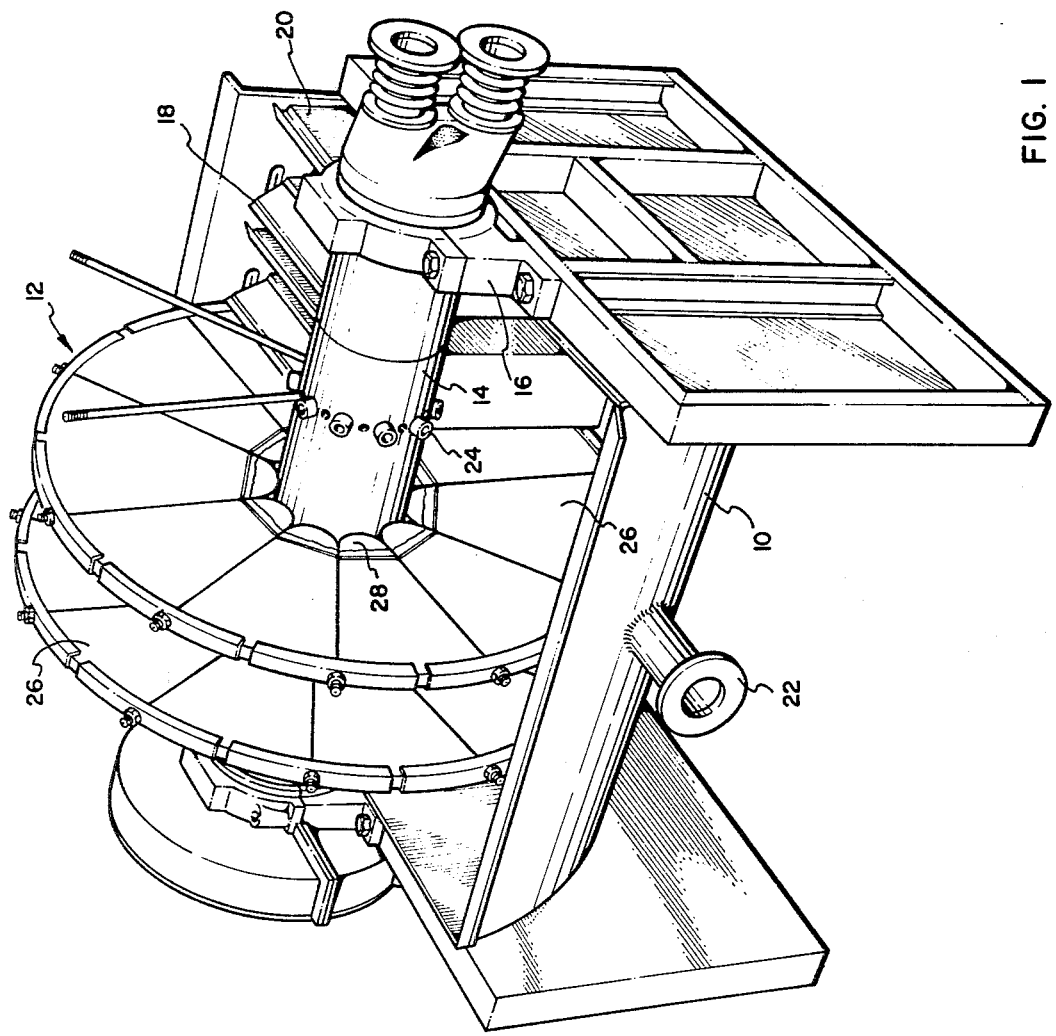
FIG. 1 is a perspective view of a conventional rotary disc filter showing filter discs each formed from ten disc sectors mounted on a rotatable shaft. For convenience only two discs are shown in the drawing.

Referring now more particularly to the drawings, FIG. 1 illustrates a rotary disc filter of conventional design which broadly comprises an elongated slurry tank 10 with one or more filter discs 12 secured to rotatable tubular shaft 14 journalled in bearing housings 16 at opposite ends of the tank. The tubular shaft 14 is of usual construction enabling attachment of a plurality of filter discs thereto. In this connection, it should be noted that the filter illustrated is incomplete in that only two discs are included. Other discs have been omitted for purposes of clarity. Scrapers 18 may be provided adjacent opposite faces of each disc to assist in cake discharge and to direct cake into collection bin 20. Slurry to be filtered is supplied through an inlet 22. Filtrate is drawn through the filter medium covering each sector into the tubular shaft through suitable ports 24 for eventual removal while the separated solids are collected as a cake on the disc surface.

Each of said sectors is covered with a conventional filter medium 30 and is attached to the tubular shaft by means of a bell adaptor 28 secured to the apex of the sector. A sector 26 comprises a wedge or triangular shaped web plate 32 (i.e., it has radial edges and a circumferential edge) with a plurality of ridges 34 on one or both faces. The ridges, which may be from ⅛ to 2 inches in height, form channels for directing filtrate and/or air flow, referred to herein as fluid flow, to the bell adaptor 28 at the apex discharge zone. The web plate 32 is preferably a substantially plane sheet member having a substantially uniform thickness. A plurality of sectors mounted side by side form a complete disc.

The ridges 34 form minor or interior channels and major radial or edge channels. Some of the interior channels communicate with the major channels at spaced points and direct flow from interior portions of the sector away from the circumferential edge thereof into a major channel thence to eventual discharge at the apex of web plate 32. As shown, at least one major channel is positioned proximate to and parallel with a radial edge of said web and it is to be noted that a plurality of major or radial channels may be provided each being arranged to accept flow from one or more but not all intersectable minor or interior channels. Preferably said major channels are positioned along and parallel to the leading edge of web plate 32. With this construction, the major channels are forced to accept fluid flow from a wide area thus insuring a relatively large volume of flow which, during air drying, results in an effective air sweep for removing residual filtrate prior to cake discharge. Preferably, each major channel will be connected to a sufficient number or length of minor channels so that the major channel handles a volume of 1.3 to 5 (preferably 1.5 to 4) times the volume it would handle alone.

To accommodate the increased volume, the channels increase in depths as they approach the apex. The desired taper may be obtained by tapering ridges 34 and/or the thickness of the web 32; however, it is preferred to use a uniformly thick web and to vary the height of the ridges. The degree of said taper is determined emperically according to the flow requirements of the sector.

The sector is preferably cast in a mold form from a conventional plastic to form a unitary structure. Other construction methods and materials may, of course, be useful in some circumstances. The phrase "circumferential edge" as used in the description refers to the edge of the sector 26 which is a portion of the outer edge or periphery of the total filter disc 12. Although the completed disc is shown as a circle, it may be formed as a plural sided figure such as an octagon, formed from triangular shaped sectors. The word "apex" refers to the truncated end of the sector where the bell is affixed and at which discharge occurs.

We claim:

1. A filter sector for a rotary disc filter of the type comprising a flat wedge-shaped web defined by an apex, an outer circumferential edge and straight side edges converging from said circumferential edge radially towards said apex, and a plurality of drainage channels on at least one face of said web for accepting fluid received on said face and conducting it towards said apex to discharge; characterized in that said drainage channels include both major and minor channels with a plurality of said major channels arranged in parallel relationship proximate to one of said side edges to extend therealong toward said apex, and wherein each of said major drainage channels is positioned to accept flow from at least one but not all of said minor drainage channels that are intersectable with said major channels.

2. The disc sector of claim 1 wherein said major drainage channels are positioned proximate to and parallel with the leading edge of said base web.

3. The disc sector of claim 2 wherein said base web is a plane member having a substantially uniform thickness and wherein said channels formed by said ridge means are tapered to carry increased fluid volume as said channels extend away from the circumferential edge of said base web.

4. The disc sector of claim 1 wherein a plurality of major drainage channels are positioned proximate to and parallel with each of said radial side edges of said base web and wherein each of said major drainage channels accept fluid from at least one but not all of said minor drainage channels that are intersectable with said major channels.

5. The disc sector of claim 4 wherein the flow accepted by each of said major drainage channels is about 1.3 to 5 times the flow that each of said major channels would carry if the major channels were the only channels collecting flow.

6. The disc sector of claim 5 wherein said ridge means are attached to each of the faces of said base web to form major and minor drainage channels on each of said faces.

7. The disc sector of claim 5 wherein said base web is a plane member having a substantially uniform thickness.

8. The disc sector of claim 7 wherein said drainage channels are tapered to carry increased fluid volume as said major and minor channels extend away from said circumferential edge of said base web.

9. The disc sector of claim 8 where major and minor drainage channels are attached to each of the faces of said base web.

10. The filter sector of claim 1 wherein the major channels are positioned to accept flow from a plurality of minor channels.

References Cited

UNITED STATES PATENTS

| | | | |
|---|---|---|---|
| 571,744 | 11/1896 | Breyer | 210—334 |
| 1,036,174 | 8/1912 | Barnes | 210—331 |
| 2,813,632 | 11/1957 | Muller | 210—486 |
| 2,894,632 | 7/1959 | Myers | 210—331 |
| 3,193,105 | 7/1965 | Putnam | 210—486 X |

FOREIGN PATENTS

| | | |
|---|---|---|
| 869,677 | 2/1942 | France. |

REUBEN FRIEDMAN, Primary Examiner

JOHN W. ADEE, Assistant Examiner